United States Patent [19]
Schlough

[11] 3,727,600
[45] Apr. 17, 1973

[54] HYDRAULIC STONE SPLITTER WITH SHOCK ABSORBER MEANS

[75] Inventor: Thomas L. Schlough, St. Cloud, Minn.

[73] Assignee: Park Tool Company, Division of The Gran-A-Stone Co., St. Cloud, Minn.

[22] Filed: Oct. 12, 1971

[21] Appl. No.: 188,159

[52] U.S. Cl. ............................ 125/23 C, 91/407
[51] Int. Cl. ............................................. B28d 1/32
[58] Field of Search ................... 125/23; 91/452, 407

[56] References Cited

UNITED STATES PATENTS

| | | | |
|---|---|---|---|
| 2,912,970 | 11/1959 | Schlough et al. | 125/23 C |
| 3,272,083 | 9/1966 | Stoll | 91/405 |
| 3,363,514 | 1/1968 | Ramcke | 91/405 X |
| 3,396,635 | 8/1968 | Darling | 91/407 X |

Primary Examiner—Harold D. Whitehead
Assistant Examiner—Nicholas P. Godici
Attorney—Orrin M. Haugen

[57] ABSTRACT

A shock absorber system for power rams employing a cylinder having a piston with a force-applying shaft coupled thereto, the piston being arranged for reciprocatory motion within the cylinder, and with the piston separating a high pressure chamber segment from a lower pressure chamber segment, the shock absorbing system including conduit means coupling the low pressure chamber segment to orifice means for permitting restricted flow of fluid from the low pressure chamber to the reservoir, and with a pressure relief valve coupled to the low pressure chamber segment, and being disposed in parallel relationship with the orifice to permit fluid flow therethrough when pressure within the low pressure chamber exceeds a certain predetermined level. Flow control valves in the form of pilot-actuated check valves are arranged to maintain the system in flooded relationship during idle periods, with the check valves being functional to isolate flow channels during operational portions of the working cycle. The shock abosrber system of the present invention is particularly adaptable for use in conjunction with hydraulically actuated rams utilized to apply extremely high forces to the jaws of stone splitting equipment, with this system reducing the rate of transfer of shock from the hydraulic system to the remainder of the structure upon splitting of the stone, with this shock energy being dissipated in the low pressure side of the hydraulically actuated main rams.

5 Claims, 4 Drawing Figures

INVENTOR.
THOMAS L. SCHLOUGH
ATTORNEY

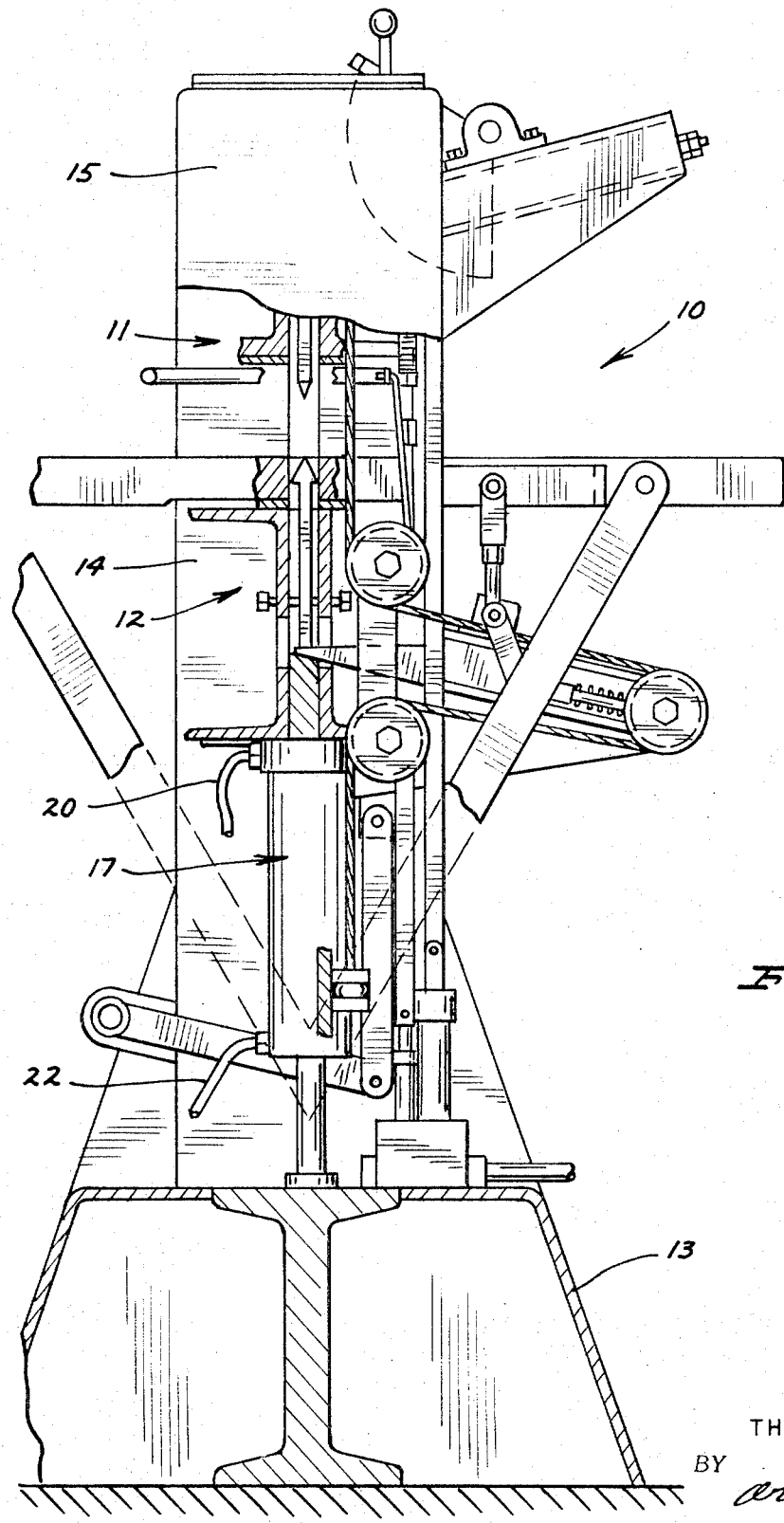

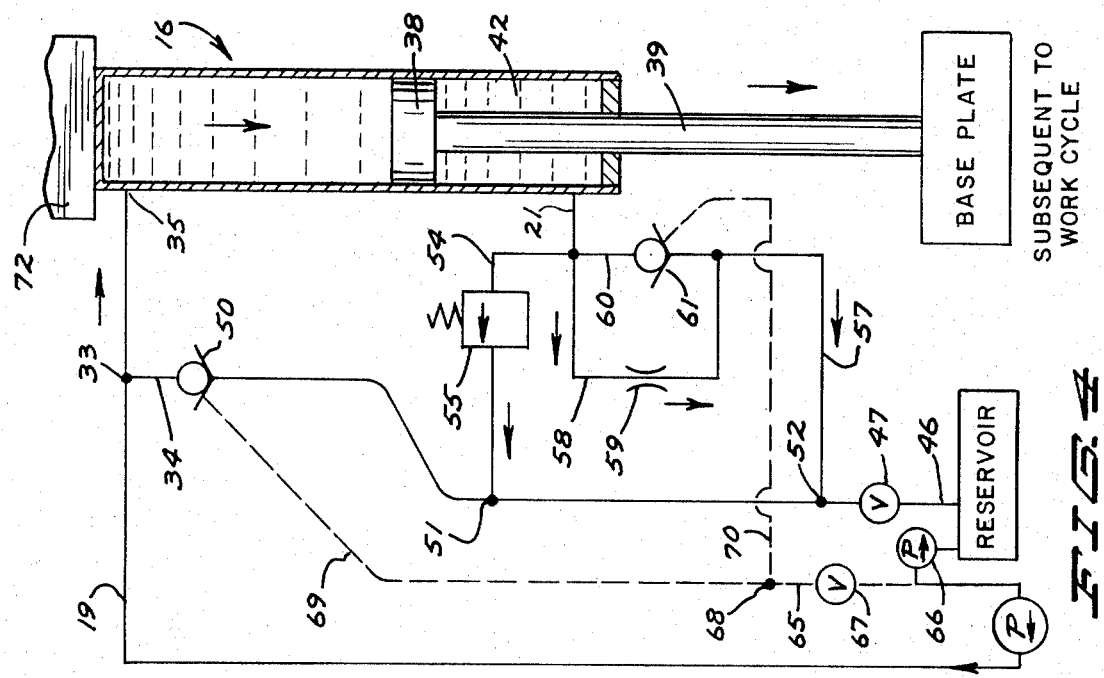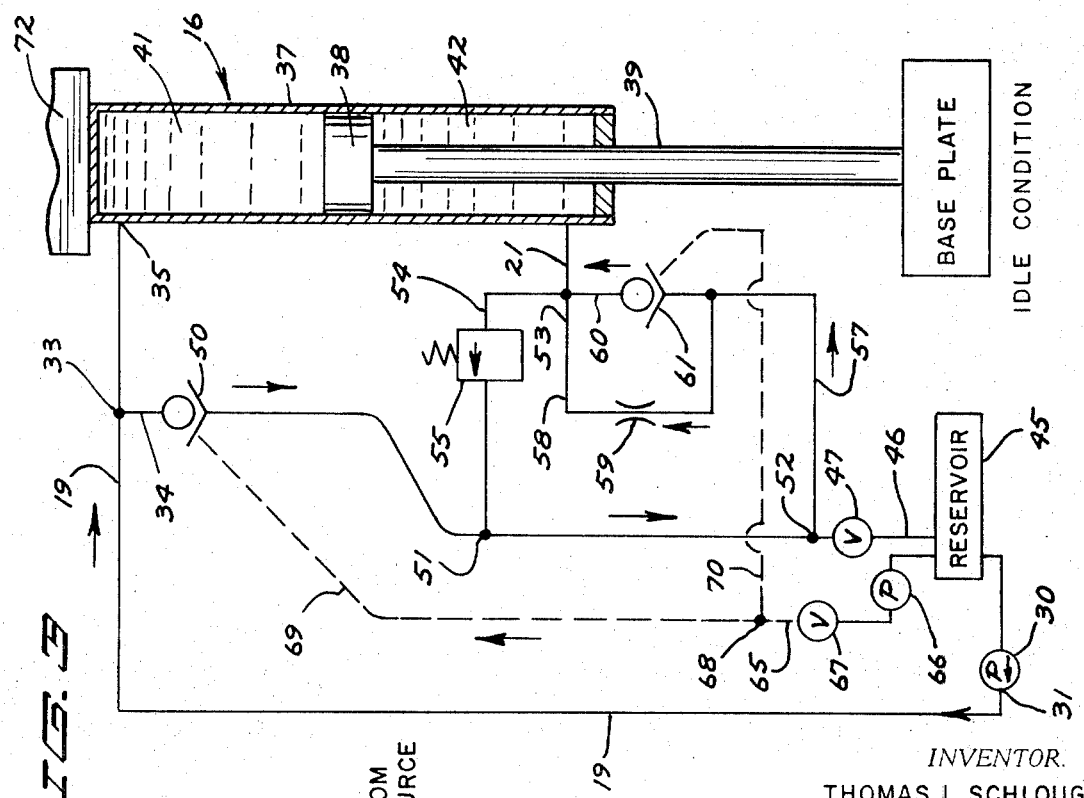

3,727,600

HYDRAULIC STONE SPLITTER WITH SHOCK ABSORBER MEANS

SUMMARY OF THE INVENTION

The present invention relates generally to a shock absorber system for power rams, and more particularly to a shock absorber system for power rams utilized to actuate the jaws of a stone splitting apparatus during the power stroke. More specifically, the present invention relates to an improved hydraulic circuit which employs a means coupled to the low pressure chamber of the power ram, and which controlably releases a charge of hydraulic fluid maintained therein upon achieving a sudden drop in resistance during the working stroke of the power ram.

Stone splitters are in common use in the stone industry for breaking or splitting stone along predetermined fracture lines. Stone splitters traditionally are equipped with a pair of relatively movable jaws, with the jaws frequently employing a set of independently actuated chisel members for accommodating any unevenness in the surface of the work. Such stone splitters are disclosed in detail in U. S. Pat. No. 2,912,970, Leon H. Schlough, et al., entitled "Apparatus for Splitting Stone Slabs and the Like". In applying the extremely heavy forces to the jaws during the splitting portion of the cycle, exceptionally high hydraulic forces are present in the power rams, particularly on the high pressure side. Upon achieving a break or fracture in the stone, the resistance to motion in the direction of the force drops to essentially zero, and the entire structure, including the ram is accordingly subjected to shock forces due to the sudden drop in pressure on the high pressure side of the ram. In order to compensate for this sudden drop, and to eliminate the excessive shock forces which are otherwise generated, the low pressure side of the piston is filled with hydraulic fluid which may be controlably released, through appropriate valving, and thereby reduce the shock forces which would otherwise be generated and transferred to the structure.

In accordance with the present invention, therefore, the low pressure side of the hydraulic ram is provided with a fluid conduit having a pair of parallelly disposed paths communicating with the return line to the reservoir or pump. In one of the two parallel paths, an orifice is provided which permits modest flow to occur during the pressure portion of the stroke, while the other path is provided with a pressure relief valve which is functional upon achieving high pressures in the system. Also, in parallel with the orifice is a flow control valve in the form of a pilot-operated check valve which is operational to provide a flooded condition for the low pressure side of the ram at all times, particularly during idling.

While hydraulic fluids are theoretically incompressible, it has been found that a substantial amount of energy can be stored in hydraulic systems operating at high pressures, this stored energy coming from modest compression of the hydraulic fluid, along with modest expansion of the conduit and hydraulic lines. It is this "stored energy" which is controlably released at the time the system experiences an abrupt termination of resistance on the advancement of the power ram.

Therefore, it is a primary object of the present invention to provide an improved shock absorber system for power rams, the system being particularly adapted for use with power rams utilized to actuate the jaws of stone splitting equipment.

It is yet a further object of the present invention to provide an improved shock absorber system for power rams which employs a system for continually maintaining a flooded condition in the low pressure chamber of the power ram, and which provides for means to controlably release the fluid from the low pressure side of the ram upon experiencing an abrupt drop in resistance to continued advancement of the power ram.

It is a further object of the present invention to provide an improved shock absorber system for power rams utilizing means for maintaining a flooded condition in the low pressure chamber of the ram, and wherein this fluid from the low pressure side may be controlably released through the system to effectively eliminate the generation of shock in the system.

Other and further objects of the present invention will become apparent to those skilled in the art upon a study of the following specification, appended claims, and accompanying drawings,

BRIEF DESCRIPTION OF THE DRAWINGS

FIG. 2 is a side elevational view of the structure shown in FIG. 1;

FIG. 3 is a schematic diagram illustrating the hydraulic system utilized to accomplish the shock absorbing function, with the arrangement in FIG. 3 showing the disposition of the components of the system during idling; and FIG. 4 is a schematic diagram of the system shown in FIG. 3, with the exception being that the components are shown in their disposition following an abrupt termination of resistance to expansion of the power ram, with the components functioning to reduce shock through the hydraulic portion of the apparatus.

DESCRIPTION OF THE PREFERRED EMBODIMENT

Figure 1:
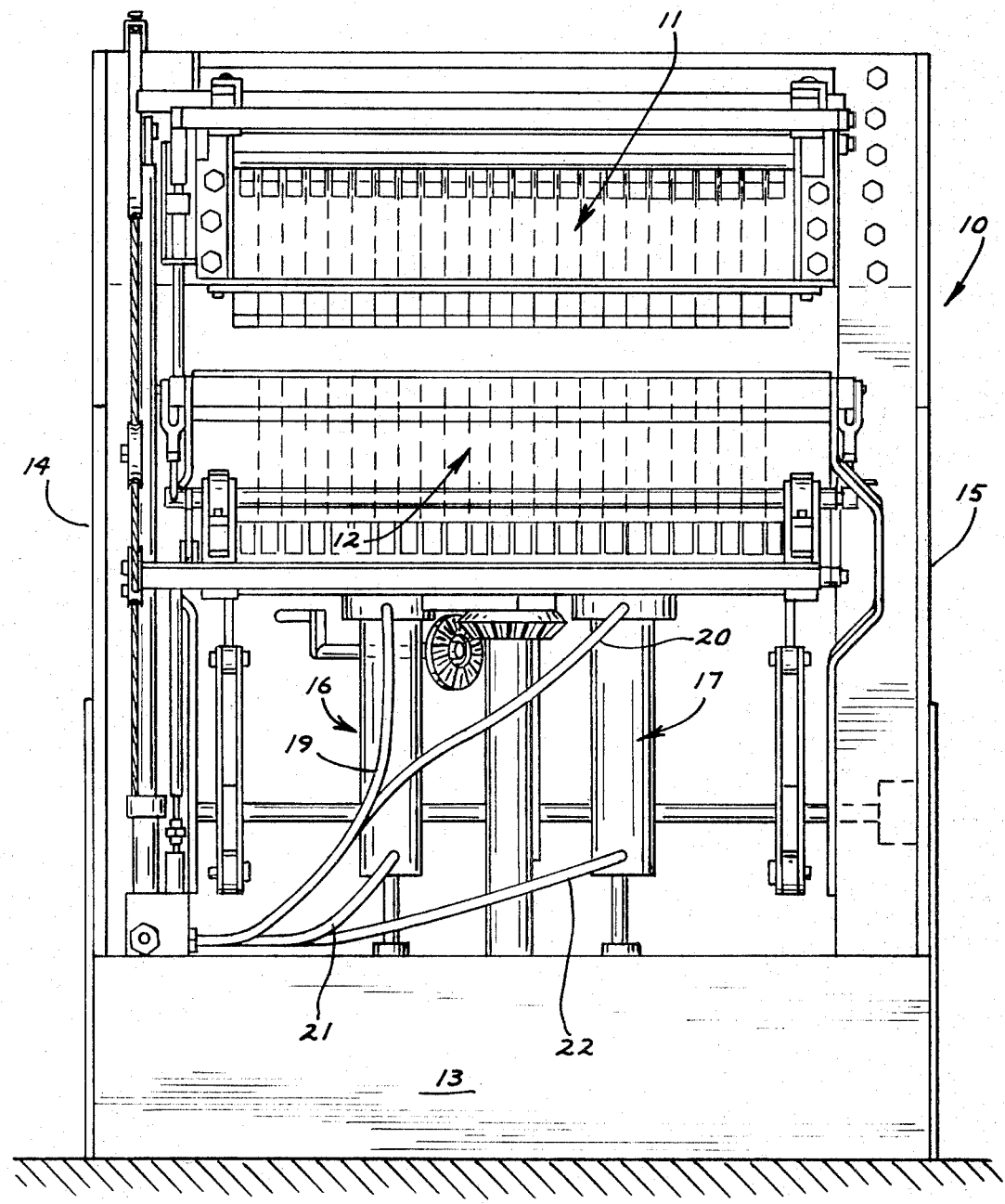
FIG. 1 is a front elevational view of a stone splitting apparatus employing the shock absorbing system of the present invention in conjunction therewith.

In connection with the preferred embodiment of the present invention, attention is directed to FIGS. 1 and 2 of the drawings wherein the hydraulic circuit apparatus of the present invention is shown coupled to a stone splitting apparatus, and operational therewith. In particular, the stone splitting apparatus is of the type disclosed and claimed in U. S. Pat. No. 2,912,970, Leon H. Schlough, et al., "Apparatus for Splitting Stone Slabs and the Like", with the structure having been modified so as to utilize the improved power ram structures and hydraulic circuits of the present invention in lieu of those shown in the structure of U. S. Pat. No. 2,912,970. Specifically, the stone splitter apparatus generally designated 10 includes a pair of relatively movable jaws, such as the upper jaw generally designated 11, and the lower jaw generally designated 12, each of these jaws being securely coupled to the frame means including the base 13 and the upright supports 14 and 15. Power rams generally designated 16 and 17 are utilized to actuate the lower jaw 12 during the power stroke so as to produce a stone splitting force across the jaws, and thereby apply a stone splitting force to a workpiece disposed between the jaws. As is indicated in FIG. 1, supply lines 19 and 20 are utilized to deliver the hydraulic working fluid under high pressure to the members 16 and 17. Return lines are shown at 21 and 22 respectively, these return lines being operational to deliver fluid back to the pressure source in order that it may be recirculated through the system, as required.

The details of the structural features along with the operational features of the stone splitter illustrated in FIGS. 1 and 2 are set forth in U. S. Pat. No. 2,912,970, and reference is made to that patent for the details of such structure. Since the hydraulic system actuating the power rams is different from that shown in U.S. Pat. No. 2,912,970, the details of the hydraulic system are described hereinbelow.

DESCRIPTION OF THE HYDRAULIC SYSTEM

Attention is now directed to FIGS. 3 and 4 of the drawings wherein the hydraulic system is illustrated schematically. In FIGS. 3 and 4, only one power ram is illustrated for purposes of simplicity, it being appreciated that each ram is an essential duplicate of the other, and for purposes of clarity only one need be described. Accordingly, the hydraulic system is provided with a main pump 30, which has an outlet at 31 for delivering hydraulic fluid under pressure to line 19. Junction point 33 is interposed along line 19, with leg 34 extending therefrom, in communication with line 19. As is indicated, line 19 is coupled to ram 16 through inlet orifice 35. Ram 16 is a fluid working cylinder, and is provided with a housing for the working cylinder 37, housing 37 having piston 38 disposed therewithin. Piston 38 has a force-applying ram or shaft securely coupled thereto. It will be appreciated that the piston 38 is arranged for reciprocatory to-and-fro motion within the confines of cylinder 37, with the cylinder being separated by piston 38 into two separate chamber segments. The high pressure chamber segment is shown at 41, with this chamber being adapted to receive a charge of hydraulic fluid from the pump 30 under high pressure. Chamber segment 42 is essentially a low pressure chamber which is adapted to retain a charge of hydraulic fluid under all operating conditions, with this fluid normally being at a pressure lower than that of the fluid retained in chamber segment 41. As is indicated in FIGS. 3 and 4, conduit means 21 are operative to return fluid from the low pressure chamber segment to the reservoir.

In order to complete the hydraulic circuit, reservoir 45 is provided, with this reservoir having conduit 46 communicating therewith. Valve 47 is utilized in return line 46 in order to maintain adequate operating and working pressure within the system at all times. Even though the rams are double-acting, an external means such as a separate cylinder and ram, or a mechanical means are preferably provided for reversing the direction of travel of piston 38 within housing 37 during retraction of the jaws, for example.

With continued attention being directed to FIG. 3, conduit or line 34 extends from junction 33 to reservoir 45, with line 34 having pilot-controlled check valve 50 disposed therealong, as well as junctions 51 and 52. Junctions 51 and 52 are operative to couple return line 21 to line 34, and ultimately deliver fluid therealong to reservoir 45. Junction 53 is disposed along line 21, with leg 54 coupling junction 53 to junction 51. Pressure relief valve 55 is disposed along line 54. Leg 57 is arranged in parallel with leg 54, and couples junction points 53 and 52. Leg 57 has a pair of parallel branches, with branch 58 having restricted orifice member 59 disposed therealong, and with branch 60 having a pilot-actuated check valve 61 disposed therealong.

The pilot-actuated check valves 50 and 61 are each coupled to pilot pressure line 65, pilot pressure line 65 deriving its fluid under pressure from any suitable source such as pump 66. Valve 67 is interposed along line 65 so as to control the operation of the valves 50 and 61. Junction 68 is interposed along line 65 and provides for delivery of fluid under pressure to valves 50 and 61 along lines 69 and 70.

The schematic diagram of FIG. 4 is identical to that of FIG. 3, with the exception of the operational mode. The components in the system shown in FIG. 4 illustrate the arrangement subsequent to the work cycle, or immediately following the abrupt termination of resistance to motion of piston 38. In order to describe the various functions, the arrangement of the system shown in FIG. 3 will be discussed initially.

OPERATIONAL MODE, IDLE CONDITION

While at idle, pump 31 is continuously running, and fluid under pressure is delivered along line 19 to chamber segment 41. Fluid is also delivered to chamber 42 by way of lines 34, 57, and 21. This is accomplished by virtue of the establishment of pilot pressure to the pilot check valves 50 and 61 along lines 69 and 70, thus accommodating the continuous flow. The fluid continues to flow through the system into reservoir 45 during the idling condition.

OPERATIONAL MODE, FORCE-APPLYING CONDITION

In order to apply force from the ram 16 against work supporting plate 72, pilot check valves 50 and 61 are each closed and fluid under high pressure is carried into chamber segment 41. In order to accommodate motion of piston 38, fluid is exhausted from chamber 42 by way of return line 21, leg 58, orifice 59, and ultimately to reservoir 45 through lines 57 and 46. This condition continues until the force-applying cycle is terminated, normally by way of an abrupt drop in resistance upon achieving splitting of stone in the working area, for example.

OPERATIONAL MODE, UPON ABRUPT DROP IN RESISTANCE

Upon achieving the abrupt drop in resistance, the potential energy or "stored energy" available in the system, particularly in chamber 41 and line 19 must be dissipated. This is achieved by the dampening effect of the fluid contained within chamber 42, with this fluid normally being discharged along parallel paths through orifice 59, with any fluids under excessive pressure being discharged through pressure relief valve 55, as well. Check 61 remains closed, and these two parallel paths will accommodate a controlled release of fluid from chamber 42 in order to accommodate controlled release of the "stored energy" from the fluid on the high pressure side of the system. This condition exists for only an extremely short and finite period of time.

It will be appreciated that this controlled release of energy from the high pressure side of the system acts to conserve packings and other items in the hydraulic portion of the system. Those packings surrounding arm or shaft 39 are particularly susceptible to damage, however their condition is protected with the system of the present invention.

I claim:

1. In combination, a stone splitter and means for actuating said splitter, said splitter having upper and lower relatively movable cutting jaws normally spaced apart to receive a stone workpiece therebetween, said actuating means including means for applying reciprocatory movement to one of said jaws so as to produce a stone splitting force across said jaws, said actuating means including:
    a. hydraulic circuit apparatus comprising a source of hydraulic fluid under pressure, first conduit means coupling the outlet of said source to a fluid working cylinder and second conduit means for returning fluid to the inlet of said pressure source for completion of the hydraulic circuit;
    b. said fluid working cylinder having a piston with a force-applying ram coupled thereto with said force-applying ram being operatively coupled to one of said jaws, said piston being arranged for reciprocatory motion within said fluid working cylinder;
    c. said fluid working cylinder defining first and second chamber segments disposed on opposite sides of said piston, with one of said chambers being adapted to receive a charge of hydraulic fluid from said source under high pressure while the other chamber retains a charge of hydraulic fluid under substantially lower pressure;
    d. third conduit means coupling said low pressure chamber to orifice means for permitting restricted flow of fluid from said low pressure chamber to said second conduit means; and
    e. pressure relief valve means coupled to said second conduit means and being disposed in parallel relationship with said orifice means and responsive to permit flow upon achieving fracture of a stone workpiece disposed between said jaws.

2. The combination as defined in claim 1 being particularly characterized in that fourth conduit means couple said first conduit means to said pressure source inlet, and first fluid control valve means are interposed within said fourth conduit means for controlling flow to said pressure source inlet.

3. The combination as defined in claim 2 being particularly characterized in that said fluid control valve means is a pilot-actuated check valve.

4. The combination as defined in claim 2 being particularly characterized in that second fluid control valve means are disposed in parallel relationship with said orifice means.

5. The combination as defined in claim 4 being particularly characterized in that said second fluid control valve is a pilot-actuated check valve.

* * * * *